(12) United States Patent
Gueta et al.

(10) Patent No.: US 11,467,943 B2
(45) Date of Patent: Oct. 11, 2022

(54) SYSTEM AND METHOD FOR STRUGGLE IDENTIFICATION

(71) Applicant: GLASSBOX LTD., Petah Tikva (IL)

(72) Inventors: Yaron Gueta, Hod Hasharon (IL); Dan Livne, Tel Aviv (IL)

(73) Assignee: GLASSBOX LTD., Petah Tikva (IL)

(*) Notice: Subject to any disclaimer, the term of this patent is extended or adjusted under 35 U.S.C. 154(b) by 22 days.

(21) Appl. No.: 17/105,548

(22) Filed: Nov. 26, 2020

(65) Prior Publication Data
US 2021/0191835 A1  Jun. 24, 2021

Related U.S. Application Data

(60) Provisional application No. 62/952,355, filed on Dec. 22, 2019.

(51) Int. Cl.
*G06F 17/18* (2006.01)
*G06F 11/34* (2006.01)
(Continued)

(52) U.S. Cl.
CPC .......... *G06F 11/3438* (2013.01); *G06F 9/453* (2018.02); *G06F 16/954* (2019.01); *G06F 17/18* (2013.01)

(58) Field of Classification Search
CPC .... G06F 11/3438; G06F 9/453; G06F 16/954; G06F 17/18; G06Q 30/0201; G06Q 30/0641

See application file for complete search history.

(56) References Cited

U.S. PATENT DOCUMENTS

| | | | | |
|---|---|---|---|---|
| 11,275,649 | B2* | 3/2022 | He | G06F 11/00 |
| 2007/0239629 | A1* | 10/2007 | Ling | G05B 23/024 |
| | | | | 706/12 |

(Continued)

OTHER PUBLICATIONS

Struggle detection—Automatically identify where your users struggle—Taken from: https://sessioncam.com/struggle-detection/ on Aug. 19, 2019.

(Continued)

*Primary Examiner* — Dino Kujundzic

(57) ABSTRACT

A struggle identification system, the system comprising processing circuitry configured to: obtain first information of first entries into a first stage and second information of second entries into a second stage, each entry of the first entries and each entry of the second entries is (a) performed during a respective session for performing an action, and (b) associated with a characteristic characterizing the respective session, wherein the characteristic is a discrete variable with a number of values; calculate, for each given value of the values, (a) a first entries number being the number of first entries associated with the characteristic having the given value into the first stage, and (b) a second entries number being the number of second entries associated with the characteristic having the given value into the second stage; and identify one or more deviating values of the values, wherein a deviating value is a value of the values associated with a first ratio between the first entries number and the second entries number of the deviating value that deviates from a second ratio of the first entries number and the second entries number for the values other than the deviating value, as determined by a statistical test, wherein the deviating values are indicative of struggle of users of sessions characterized by the characteristic with the deviating values to complete the first stage.

20 Claims, 4 Drawing Sheets

| OS | Count | "Expected" |
|---|---|---|
| iOS | 75 | 0.05*1375 = 68 |
| MS | 250 | 0.19*1375 = 261 |
| Android | 300 | 316 |
| Other | 150 | 178 |
| Symbian | 600 | 522 |
| Total | 1375 | |

Table 140

(51) Int. Cl.
   *G06F 16/954*     (2019.01)
   *G06F 9/451*      (2018.01)

(56)         References Cited

U.S. PATENT DOCUMENTS

| 2012/0323682 | A1  | 12/2012 | Shanbhag et al. |
| 2014/0137052 | A1  | 5/2014  | Hernandez et al. |
| 2017/0061307 | A1  | 3/2017  | Bates et al. |
| 2017/0285755 | A1  | 10/2017 | Churchill et al. |
| 2018/0032880 | A1  | 2/2018  | Ramachandran et al. |
| 2018/0033073 | A1  | 2/2018  | Ramachandran et al. |
| 2018/0039530 | A1  | 2/2018  | Ciabarra, Jr. et al. |
| 2019/0260818 | A1* | 8/2019  | Ciabarra, Jr. ....... G06F 11/3664 |
| 2021/0142258 | A1* | 5/2021  | Noivo ................. G06F 11/3608 |
| 2022/0222520 | A1* | 7/2022  | Min ......................... G06N 3/08 |

OTHER PUBLICATIONS

Brian Wolnik, Automatically Detect Visitor Struggle—A video by IBM, taken from: https://www.youtube.com/watch?v=SXyyKTi1_A4&feature=youtu.be on Aug. 19, 2019.

What is struggle analytics, IBM—Taken from: https://www.ibm.com/support/knowledgecenter/en/SSES6Y/cxcloud/cxcloud_q_a_watson_assistant/what_is_struggle_analytics.html on Aug. 20, 2019.

* cited by examiner

| OS | Count | Ratio (out of total) |
|---|---|---|
| iOS | 15000 | 0.05 |
| MS | 50000 | 0.19 |
| Android | 60000 | 0.23 |
| Other | 35000 | 0.13 |
| Symbian | 100000 | 0.38 |
| Total | 260000 | |

Table 130

Fig. 4

| OS | Count | "Expected" |
|---|---|---|
| iOS | 75 | 0.05*1375 = 68 |
| MS | 250 | 0.19*1375 = 261 |
| Android | 300 | 316 |
| Other | 150 | 178 |
| Symbian | 600 | 522 |
| Total | 1375 | |

Table 140

Fig. 5

SYSTEM AND METHOD FOR STRUGGLE IDENTIFICATION

TECHNICAL FIELD

The invention relates to a system and method for struggle identification.

BACKGROUND

Struggle is a condition of the online customer experience, where customers encounter difficulties when they interact with a website or an application, thus not completing the end goals of the website or application. For example: Struggle in an e-commerce website can happen when customers try to complete a purchase but are unable to do so.

Struggle on a website or an application can manifest in different ways, in Indications of struggle can include repetitive clicking on a UI element, multiple attempts to complete a form field or going back and forth between pages on a website multiple time.

A website or an application can be broken down into funnels. Each funnel is a series of stages the customer journeys through during a session in order to complete the end goal of the website or application. For example: a funnel in an e-commerce application selling flight tickets, can include the following series of stages: a registration stage, a flight choice stage, a flight details completion stage and a ticket purchase stage. Customers complete the stages of the funnel in order to complete the end goal of the application— selling flight tickets to the customers. Only a proportion of customers starting each stage, complete the stage and continue to the subsequent stage.

Struggle can be identified within the stages of the funnel. Current struggle analytics solutions do not automatically discover areas within a website or an application where the customers are struggling based on the analysis of a breakdown of the sessions of the customers as they ate journeying through the stages of the funnel according to features of the sessions. There is thus a need in the art for a new method and system for struggle identification.

References considered to be relevant as background to the presently disclosed subject matter are listed below. Acknowledgement of the references herein is not to be inferred as meaning that these are in any way relevant to the patentability of the presently disclosed subject matter.

US Patent application No. 2018/0032880 (Ramachandran el al.) published on Feb. 1, 2018, discloses an approach that receives, over a computer network, transaction data from a number of clients that are running an app. The approach generates association rules by inputting the transaction data to an association rule learning algorithm, such as an Apriori algorithm. Each association rule is based on a user transaction pattern and a desired result, and each association rule includes a generated confidence value that pertains to an expected performance of one of the steps included in the respective association rule. The app is then modified based on an analysis of the generated confidence values, with the app modification being directed towards improving one or more of the confidence values.

US Patent application No. 2017/0285755 (Churchill et. al.) published on Oct. 5, 2017, discloses computer-implemented methods for analyzing interactions between a user and a computing device include analyzing user interaction data to identify a plurality of user gestures, and analyzing the gestures to identify those likely to represent user struggles or difficulties encountered with a user interface. A predictive model is generated front this analysis for use in identifying user gestures likely to represent user struggles during further user sessions.

US Patent application No. 2014/0137052 (Hernandez et al.) published on May 15, 2014, discloses a capture system may capture client events for an application session. Some client events may contain display information associated with screen gestures. The screen gestures may be associated with any user input that changes how images are displayed during the application session. For example, the screen gestures may comprise one or more of a scroll gesture, a touch start gesture, a touch move gesture, a touch end gesture, and/or a pinch gesture. In another example the screen gesture may comprise a reorientation of a device operating in the application session. A replay system may replay the application session based on the captured client events to recreate images displayed during the application session in response to the screen gestures.

US Patent application No. 2017/0061307 (Hales et al.) published on Mar. 2, 2017, is directed toward systems and methods for identifying contributing factors associated with a metric anomaly. One or more embodiments described herein identify contributing factors based on statistical analysis and machine learning. Additionally, one or more embodiments identify sub-factors associated with each contributing factor. In one or more embodiments, the systems and methods provide an interactive display that enables a user to select a particular anomaly for Anther analysis. The interactive display also provides additional interfaces through which the user can view informational displays that illustrate the factors that caused the particular anomaly and how those factors correlate with each other.

US Patent application No. 2012/0323682 (Shanbhag et al.) published on Dec. 20, 2012, discloses systems and methods for behavioral modeling to optimize shopping cart conversion are discussed. For example, a method can include identifying a user interacting with a networked system, accessing user profile data associated with the user, tracking user activity associated with the user, accessing a behavioral model, applying the behavioral model, and determining a shopping cart optimization. The behavioral model can be generated from historical data detailing interactions with the networked system. The behavioral model can be applied to the user profiled data and the user activity data to assist in selection of a shopping cart optimization.

US Patent application No. 2018/0039530 (Ciabarra, Jr. et al.) published on Feb. 8, 2018, discloses techniques for monitoring operation of and/or interaction with a website to detect events ("frustration events"). In at least one embodiment, a detection system is disclosed that can monitor a website for the same or unrelated interaction and operation to detect events that affect the performance of a website, while contributing to the frustration of user interaction with the website. The detection system can monitor interaction with and or operation of one or more documents of a website. Interactions with a website, operations of the website, or a combination thereof, may be assessed with respect to a threshold defining an event. One or more criteria (e.g., a time period) of the event may be assessed for the interactions and operations. Event data may be generated for the event(s) that occur, and the event data may be sent to a host system to adjust operation of the website.

GENERAL DESCRIPTION

In accordance with a first aspect of the presently disclosed subject matter, there is provided a struggle identification system, the system comprising processing circuitry configured to: obtain first information of first entries into a first stage and second information of second entries into a second stage, each entry of the first entries and each entry of the second entries is (a) performed during a respective session for performing an action, and (b) associated with a characteristic characterizing the respective session, wherein the characteristic is a discrete variable with a number of values: calculate, for each given value of the values, (a) a first entries number being the number of first entries associated with the characteristic having the given value into die first stage, and (b) a second entries number being the number of second entries associated with the characteristic having the given value into the second stage; and identify one or more deviating values of the values, wherein a deviating value is a value of the values associated with a first ratio between the first entries number and the second entries number of the deviating value that deviates from a second ratio of the first entries number and the second entries number for the values other than the deviating value, as determined by a statistical test, wherein the deviating values are indicative of struggle of users of sessions characterized by the characteristic with the deviating values to complete the first stage.

In some cases, the first stage and the second stage are two subsequent stages of a sequence of stages, the second stage being subsequent to the first stage.

In some cases, the first stage and the second stage are the same stage at different points in time.

In some cases, the first stage and the second stage are two stages of a sequence of stages at different points in time.

In some cases, the first stage and the second stage are identified based on input from a user of the system.

In some cases, the processing circuitry is further configured to: provide a user of the system with an alert indicating the deviating values.

In some cases, the deviating value is identified when the deviation of the first ratio from the second ratio exceeds a threshold.

In some cases, the statistical test is a chi-squared statistical test.

In some cases, the characteristic is one or more of the following: device type of a device used to perform the session, operating system of the device, resolution of a screen of the dev ice or geolocation of the dev ice during the session.

In some cases, the session is a web session.

In some cases, each stage is a well page.

In some cases, the session is an applicative session.

In some cases, each stage is a pad of an application.

In some cases, a dev ice used to perform the session is a mobile device and each stage is a part of a mobile application.

In accordance with a second aspect of the presently disclosed subject matter, there is provided a method comprising, obtaining, by a processing circuitry, first information of first entries into a first stage and second information of second entries into a second stage, each entry of the first entries and each entry of the second entries is (a) performed during a respective session for performing an action, and (b) associated with a characteristic characterizing the respective session, wherein the characteristic is a discrete variable with a number of values: calculating, by the processing circuitry, for each given value of the values, (a) a first entries number being the number of first entries associated with the characteristic having the given value into the first stage, and (b) a second entries number being the number of second entries associated with the characteristic having the given value into the second stage, and identifying; by the processing circuitry, one or more deviating values of the values, wherein a deviating value is a value of the values associated with a first ratio between the first entries number and the second entries number of the deviating value that deviates from a second ratio of the first entries number and the second entries number for the values other than the deviating value, as determined by a statistical test, wherein the deviating values are indicative of struggle of users of sessions characterized by the characteristic with the deviating values to complete the first stage.

In some cases, the first stage and the second stage are two subsequent stages of a sequence of stages, the second stage being subsequent to the first stage.

In some cases, the first stage and the second stage are the same stage at different points in time.

In some cases, the first stage and the second stage are two stages of a sequence of stages at different points in time.

In some cases, the first stage and the second stage are identified based on input from a user of the system.

In some cases, the method further comprising providing, by the processing circuitry, a user of the system with an alert indicating the deviating values.

In some cases, the deviating value is identified when the deviation of the first ratio from the second ratio exceeds a threshold.

In some cases, the statistical test is a chi-squared statistical test.

In some cases, the characteristic is one or more of the following: device type of a device used to perform the session, operating system of the device, resolution of a screen of the device or geolocation of the device during the session.

In some cases, the session is a web session.

In some cases, each stage is a web page.

In some cases, the session is an applicative session.

In some cases, each stage is a pan of an application.

In some cases, a device used to per form the session is a mobile device and each stage is a pan of a mobile application.

In accordance with a third aspect of the presently disclosed subject matter, there is provided a non-transitory computer readable storage medium having computer readable program code embodied therewith, the computer readable program code, executable by at least one processor of a computer to perform a method comprising: obtaining, by a processing circuitry, first information of first entries into a first stage and second information of second entries into a second stage, each entry of the first entries and each entry of the second entries is (a) performed during a respective session for performing an action, and (b) associated with a characteristic characterizing the respective session, wherein the characteristic is a discrete variable with a number of values; calculating, by the processing circuitry, for each given value of the values, (a) a first entries number being the number of first entries associated with the characteristic having the given value into the first stage, and (b) a second entries number being the number of second entries associated with the characteristic having the given value into the second stage; and identifying, by the processing circuitry, one or more deviating values of the values, wherein a deviating value is a value of the values associated with a first ratio between the first entries number and the second entries number of the deviating value that deviates from a second ratio of the first entries number and the second entries number for the values other than the deviating value, as determined by a statistical test, wherein the deviating values are indicative of struggle of users of sessions characterized by the characteristic with the deviating values to complete the first stage.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIG. 4 is an exemplary table for analyzing number of entries into a first stage using a statistical test;

FIG. 5 is an exemplary table for analyzing number of entries into a second stage using a statistical test.

DETAILED DESCRIPTION

Figure 1A:
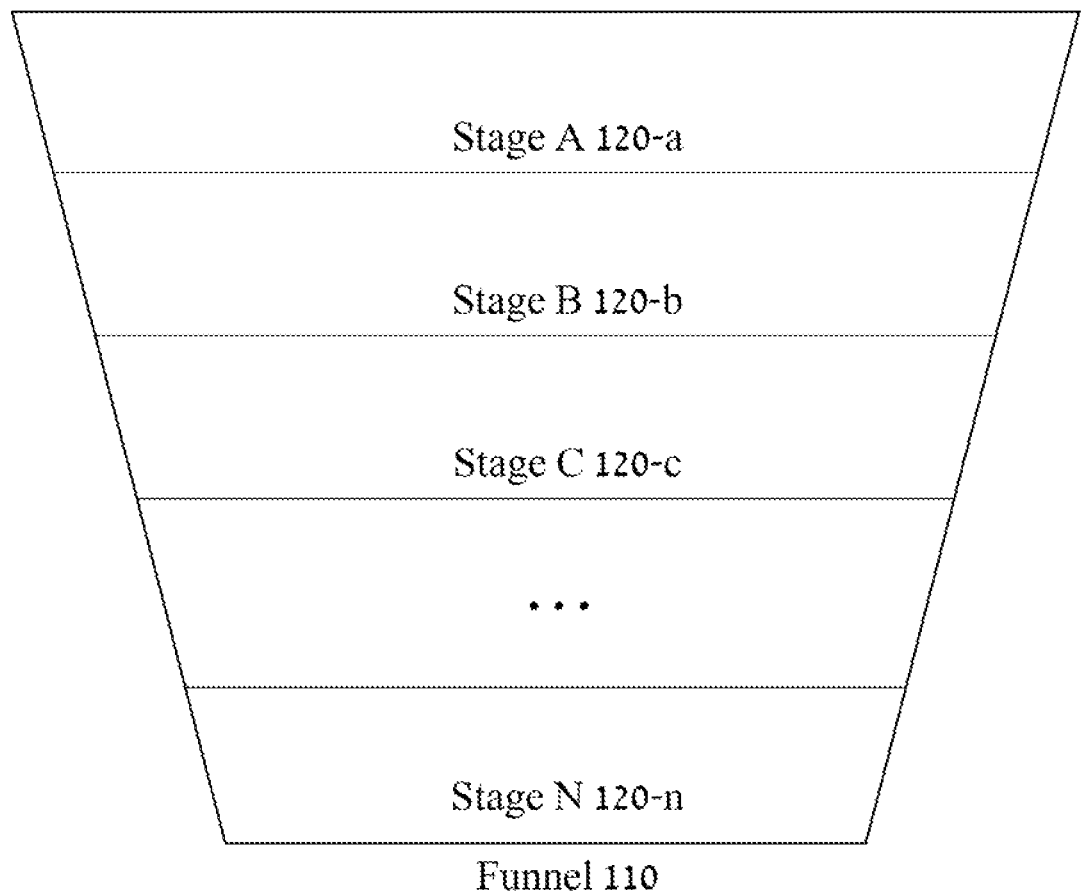
FIG. 1a is a schematic illustration of an exemplary funnel with a number of stages, each stage having a number of individual sessions entering the stage and a proportion of them entering the next stage, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "calculating", "identifying", "providing", "determining", "alerting", "journeying" or the like, include action and/or processes of a computer that manipulate and/or transform data into other data, said data represented as physical quantities, e.g. such as electronic quantities, and/or said data representing the physical objects. The terms "computer", "processor", "processing resource", "processing circuitry" and "controller" should be expansively construed to cover any kind of electronic device with data processing capabilities, including, by way of non-limiting example, a personal desktop laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example", "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiments).

It is appreciated that, unless specifically stated otherwise, certain features of the presently disclosed subject matter, which are, for clarity, described in the context of separate embodiments, may also be provided in combination in a single embodiment Conversely, various features of the presently disclosed subject matter, which are, for brevity, described in the context of a single embodiment, may also be provided separately or in any suitable sub-combination.

Figure 2:
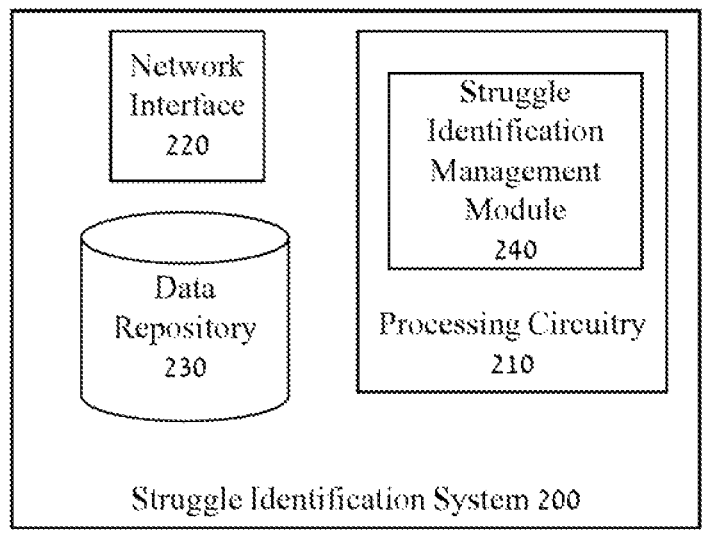
FIG. 2 is a block diagram schematically illustrating one example of a system for struggle identification, in accordance with the presently disclosed subject matter.
Figure 3:
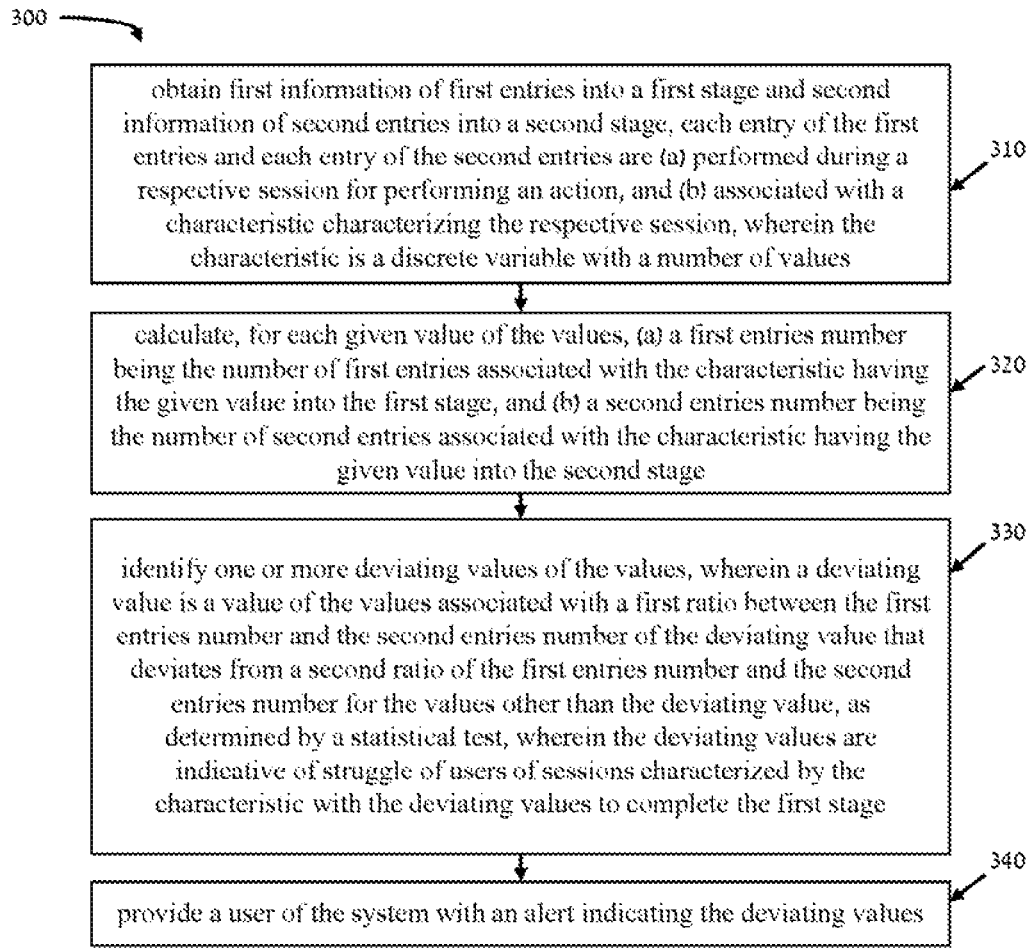
FIG. 3 is a flowchart illustrating one example of a sequence of operations carried out for struggle identification, in accordance with the presently disclosed subject matter.

In embodiments of the presently disclosed subject matter, fewer, more and or different stages than those shown in FIG. 3 may be executed. In embodiments of the presently disclosed subject matter one or more stages illustrated in FIG. 3 may be executed in a different order and/or one or more groups of stages may be executed simultaneously. FIGS. 1a, 1b, 2, 4 and 5 illustrate a general schematic of the system architecture in accordance with an embodiment of the presently disclosed subject matter. Each module in FIGS. 1a, 1b, 2, 4 and 5 can be made up of any combination of software, hardware anchor firmware that performs the functions as defined and explained herein. The modules in FIGS. 1a, 1b, 2, 4 and 5 may be centralized in one location or dispersed over more than one location. In other embodiments of the presently disclosed subject matter, the system may comprise fewer, more, and/or different modules than those shown in FIGS. 1a, 1b, 2, 4 and 5.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1a, is a schematic illustration of an exemplary funnel with a number of stages, each stage having a number of individual sessions entering the stage and a proportion of them entering the next stage, in accordance with the presently disclosed subject matter.

It is to be noted that the terms "session" and "customer session" are used herein interchangeably.

A website or an application can be broken down into one or more funnels 110. Each funnel 100 is a series of stages (e.g. stage A 120-a, stage B 120-b, stage C 120-c, . . . , Stage N 120-n) a customer journeys through during a session in order to complete the end goal of the funnel 110 within the website or application Each stage can include one or more steps, wherein each step comprises information displayed to the customer or actions taken by the customer to complete the respective stage. For example: a funnel 110 can be pan of an e-commerce application selling flight tickets. This exemplary funnel 110 can include the following series of stages: a registration stage, a flight search stage, a flight choice stage, a passenger details completion stage and a ticket purchase stage. The ticket purchase stage can include, for example, the steps of displaying the cost of chosen tickets to the customer and an action taken by the customer of filling his credit card details and approving payment.

Funnel 110 can be part of a website, an application, a mobile application, a game or any other platform that a customer interacts with in stages (e.g. stage A 120-a, stage B 120-b, stage C 120-c Stage N 120-n), in order to complete an end goal. In some cases, when funnel 110 is pan of a website, each stage can be one or more webpages within the website. In some cases, funnel 110 involves an on-line advertisement as the entry point to the funnel 110.

Only a proportion of customers starting each stage (e.g. stage A 120-a, stage B 120-b, stage C 120-c, . . . , Stage N 120-n), complete the respective stage and continue to the subsequent stages. In some cases, the number of customers sessions entering a given stage can be the same as the number of customers sessions completing the given stage and entering a subsequent stage. In some cases, none of the customers sessions entering the given stage complete the stage, and no customers sessions enter the subsequent stage. In some cases, a customer session can enter the funnel 110 into an intermediate stage, without passing through one or more of the stages preceding the intermediate stage. In some cases, a large number of customers enter the funnel 110, yet only a smaller number of them perform the intended actions and reach the end goal of the funnel 110. Continuing the above example, a customer that does not find a flight answering his requirements may not complete the flight choice stage.

FIG. 1a is a non-limiting exemplary funnel 110, wherein the width of the stages (e.g. stage A 120-a, stage B 120-b, stage C 120-c, . . . , Stage N 120-n) in the figure represent the amount of customers sessions entering each stage, thus as the funnel 110 narrows, less customers sessions complete a given stage and enter the subsequent stage, subsequent to the given stage. Accordingly, the number of customers sessions entering stage N 120-n is smaller than the number of customers sessions entering stage C 120-c, which in turn is smaller than the number of customers sessions entering stage B 120-b, which in turn is smaller than the number of customers sessions entering stage A 120-a. the amount of customers sessions entering each stage can be measured over a given time period.

Analysis of the amount of customers sessions entering each stage (e.g. stage A 120-a, stage B 120-b, stage C 120-c, . . . , Stage N 120-n) can lead to identification of struggle of the customers to complete the end goal of the funnel 110.

Struggle is a condition of the online customer experience, where customers encounter difficulties when they interact with a website or an application, thus not completing the end goals of the website or application. Struggle on a website or an application can manifest in different ways. Indications of struggle can include repetitive clicking on a UI element, multiple attempts to complete a form field or going back and forth between pages on a website multiple time. In our example above, the flight choice stage may require completing a form that some of the customer find hard to complete.

The presently disclosed struggle identification system can automatically analyze the amount or number of customers sessions entering each stage (e.g. stage A 120-a, stage B 120-b, stage C 120-c, . . . , Stage N 120-n) of funnel 110 in order to identify struggle.

Each customer session can have one or more characteristics or features, characterizing the customer session. For example: device type of a device used to perform the session, type of Operating System (OS) installed on the device used to perform the session, resolution of a screen of the device used to perform the session, geolocation of the device used to perform the session during the session, or any other feature characterizing the session. Each characteristics or features can have one or more values. For example, the "type of OS installed on the device used to perform the session" characteristic can have the following non-limiting exemplary values: iOS, MS. Andriod, Symbian and Other.

Figure 1B:
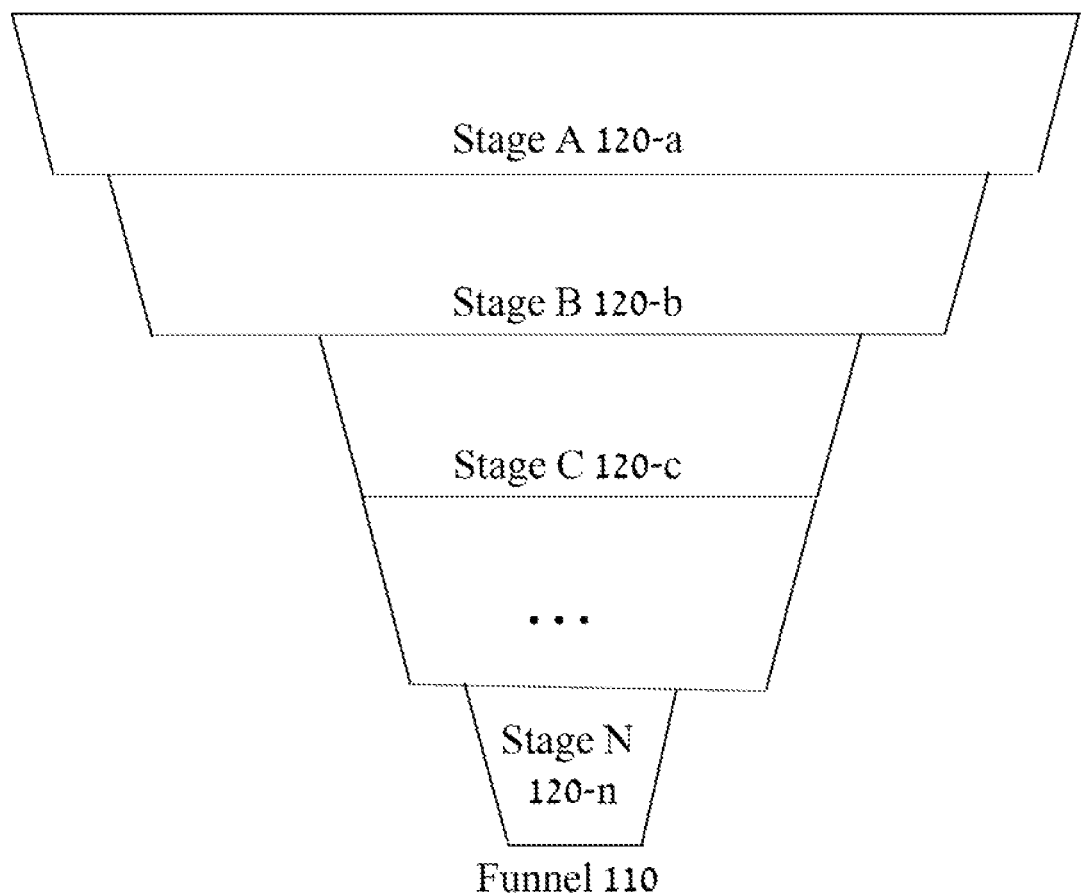
FIG. 1b is a schematic illustration of the exemplary funnel, wherein the number of individual sessions entering each stage and a proportion of them entering the next stage are for sessions with a given characteristic, in accordance with the presently disclosed subject matter.

FIG. 1b, is a schematic illustration of the exemplary funnel, wherein the number of individual sessions entering each stage and a proportion of them entering the next stage are for sessions with a given characteristic, in accordance with the presently disclosed subject matter.

As described above, the width of the stages (e.g. stage A 120-a, stage B 120-b, stage C 120-c, . . . , Stage N 120-n) of funnel 110 in FIG. 1a represent the amount of all customers sessions entering each stage. Accordingly, the number of customers sessions entering stage N 120-n is smaller than the number of customers sessions entering stage C 120-c, which in turn is smaller than the number of customers sessions entering stage B 120-b, which in turn is smaller than the number of customers sessions entering stage A 120-a.

The widths of the stages (e.g. stage A 120-a, stage B 120-b, stage C 120-c, . . . , Stage N 120-n) in FIG. 1b 1a represent the amount of customers sessions with a specific characteristic value entering each stage, thus are different from the widths of the stages (e.g. stage A 120-a, stage B 120-b, stage C 120-c, . . . , Stage N 120-n) of funnel 110 in FIG. 1a. For example: the widths of the stages in funnel 110 in FIG. 1a can represent all customer sessions entering the stages, regardless of the OS of the device used to perform the sessions, while the widths of the stages in funnel 110 in FIG. 1b represent only customer sessions entering the stages front devices with an iOS operating system. It can be seen in this example that the number of customer sessions entering each stage with an iOS operating system deviates from the distribution of the number of all customer sessions entering each stage.

The struggle identification system can analyze the information of amounts of customer sessions entering a first stage (e.g. stage A 120-a, stage B 120-b, stage C 120-c, . . . , Stage N 120-n) and amounts of customer sessions entering a second stage in accordance with a breakdown of the amounts of sessions matching given values of the characteristics or features of the sessions using statistical tests in order to identify struggle in the first stage, as further detailed herein, inter alia with respect to FIG. 3.

Turning to FIG. 2, there is shown a block diagram schematically illustrating one example of a system for struggle identification, in accordance with the presently disclosed subject matter.

According to certain examples of the presently disclosed subject matter, struggle identification system 200 can comprise, or be otherwise associated with, a data repository 230 (e.g. a database, a storage system, a memory including Read Only Memory—ROM. Random Access Memory—RAM, or any other type of memory, etc.) configured to store data, including, inter alia, information of one or more funnels 110, information about one or more stages (e.g. stage A 120-a, stage B 120-b, stage C 120-c, . . . , Stage N 120-n) of at least some of the funnels 110, information of entries into the stages, information about sessions that the entries are associated with, one or more features or characteristics characterizing the sessions and their values, etc. Data repository 230 can be further configured to enable retrieval and/or update and/or deletion of the stored data. It is to be noted that in some cases, data repository 230 can be distributed, while the struggle identification system 200 has access to the information stored thereon, e.g. via a wired or wireless network to which struggle identification system 200 is able to connect to. It is to be noted that in some cases, data repository 230 is a Data Warehouse (DW) holding current and historical information about one or more funnels 110. The DW is accessible to the struggle identification system 200 for retrieval and/or update and/or deletion of current and historical data. In some cases, data repository 230, or parts thereof, are stored on cloud computing resources.

Struggle identification system 200 may further comprise a network interface 220 (e.g. a network card, a WiFi client, a LiFi client, 3G/4G client, or any other network connection enabling component), enabling struggle identification system 200 to communicate over a wired or wireless network with one or more external systems, for example: for retrieving data related to the sessions. In some cases, at least one of the connections are over the Internet.

Struggle identification system 203 further comprises a processing circuitry 210. Processing circuitry 210 can be one or more processing units (e.g. central processing units), microprocessors, microcontrollers (e.g. microcontroller units (MCUs)) or any other computing devices or modules including multiple anchor parallel and/or distributed processing units, which are adapted to independently or cooperatively process data for controlling relevant struggle identification system 200 resources and for enabling operations related to struggle identification system 200 resources.

The processing circuitry 210 can comprise a struggle identification management module 240.

Struggle identification management module 240 can be configured to perform a struggle identification process, as further detailed herein, inter alia with respect to FIG. 3.

Attention is drawn to FIG. 3, a flowchart illustrating one example of a sequence of operations carried out for struggle identification, in accordance with the presently disclosed subject matter.

According to certain examples of the presently disclosed subject matter, struggle identification system 200 can be configured to perform a struggle identification process 300, e.g. utilizing the struggle identification management module 240.

As detailed above, struggle identification system 200 can obtain first information of first entries into a first stage (out of, e.g., stage A 120-a, stage B 120-b, stage C 120-c, . . . , Stage N 120-n) and second information of second entries into a second stage, each entry of the first entries and each entry of the second entries are (a) performed during a respective session for performing an action, and (b) associated with a characteristic characterizing the respective session, wherein the characteristic is a discrete variable with a number of values (block 310). The first information can include the number of first entries into the first stage during a first time-window and the second information can include the number of second entries into the second stage during a second time-window. The first and second time-windows can be each the same or different time periods. The first and second time-windows can also be during specific dates, time of day, hours, days, weeks, months, quartets, years or any other time period.

In some cases, the information about the entries in funnel 110 can be provided to the struggle identification system 200 from a recording system, recording at least some of the customer sessions within funnel 110. The recording can be made for a given period of time. The recording system can be part of the struggle identification system 200 or external thereto. In some cases, the recording system can be controlled by a same entity that controls the struggle identification system 200 and, in some cases, the recording system is controlled by a third part.

In some cases, the first stage (e.g. stage A 120-a, stage B 120-b, stage C 120-c, . . . , Stage N 120-n) and the second stage are two subsequent stages of a sequence of stages, the second stage being subsequent to the first stage. For example, continuing our non-limiting flight ticket selling e-commerce application example above, the first stage can be the registration stage the and the second stage can be the flight choice stage that is subsequent to the registration stage.

In some cases, the first stage (e.g. stage A 120-a, stage B 120-b, stage C 120-c, . . . , Stage N 120-n) and the second stage are the same stage at different points in time or during different periods of time. For example: the first stage can be the ticket purchase stage of the previous example during the first month of this year and the second stage can be the same ticket purchase stage at the first month of a previous year. In these cases, struggle identification system 200 can identify struggle in a given stage at a certain time period compared to the entries into the same stage in another time period.

In some cases, the first stage (e.g. stage A 120-a, stage B 120-b, stage C 120-c, . . . , Stage N 120-n) and the second stage are two stages of a sequence of stages at different points in time. For example: the first stage can be the flight details completion stage of the previous example during a first quarter of this year and the second stage can be the ticket purchase stage during a second quarter of this year. In these cases, struggle identification system 200 can identify struggle in a given stage at a certain time period compared to the entries into another stage in another time period.

In some cases, the first stage (e.g. stage A 120-a, stage B 120-b, stage C 120-c, . . . , Stage N 120-n) and the second stage are identified based on input from a user of the struggle identification system 200. For example: by the user of the struggle identification system 200 using a User Interface (UI) of struggle identification system 200 to identify one or more stages of the funnel 110.

In some cases, the characteristic is, but not limited to, one or more of the following: device type of a device used to perform the session, type of OS installed on the device used to perform the session, resolution of a screen of the device used to perform the session, geolocation of the device used to perform the session during the session, or any other feature characterizing the session.

In some cases, the session is a web session and each stage (e.g. stage A 120-*a*, stage B 120-*b*, stage C 120-*c*, . . . , Stage N 120-*n*) is a web page. In some cases, the session is an applicative session and each stage is a part of an application. In these cases, a device used to perform the session can be a mobile device and each stage can be a part of a mobile application.

After obtaining the first information and the second information, struggle identification system 200 calculates, for each given value of the values, (a) a first entries number being the number of first entries associated with the characteristic having the given value into the first stage (e.g. stage A 120-*a*, stage B 120-*b*, stage C 120-*c*, . . . , Stage N 120-*n*), and (b) a second entries number being the number of second entries associated with the characteristic having the given value into the second stage (block 320). In some cases, the struggle identification system 200 also calculates for each given value, the ratio of the number of first entries out of the number of all of the first entries.

Attention is drawn in this respect to FIG. 4 which depicts table 130, which is a non-limiting exemplary table of information used for analyzing the number of entries into a first stage using a statistical test. In table 130 the count is the number of entries into the first stage (e.g. stage A 120-*a*, stage B 120-*b*, stage C 120-*c*, . . . , Stage N 120-*n*) and the characteristic of the sessions used by struggle identification system 200 to analyze the first information and to identify struggle within funnel 110 are in accordance to the "type of the OS installed on the devices used to perform the sessions" characteristic. In this non-limiting example, 260,000 total entries during a certain time period into the first stage have been obtained by struggle identification system 200. Out of those, 15,000 entries have been performed by devices having iOS operating system installed on them. 50,000 entries have been performed by devices having MS operating system installed on them. 60,000 entries have been performed by devices having Android operating system installed on them. 100,000 entries have been performed by devices having Symbian operating system installed on them and 35,000 entries have been performed by devices having another operating system installed on them. As depicted in table 130, struggle identification system 200 can also calculate the ratio out of the total for each value of the "type of the OS installed on the devices used to perform the sessions" characteristic.

Further in this respect, FIG. 5 depicts table 140, which is a non-limiting exemplary table comprising information used for analyzing the number of entries into a second stage using a statistical test, as further detailed herein. Table 140 can include an "Expected" column. The "Expected" column can be calculated by struggle identification system 200 for each given values of the values by multiplying the ratio (out of the total) calculated for the given value in the first stage (e.g. stage A 120-*a*, stage B 120-*b*, stage C 120-*c*, . . . , Stage N 120-*n*) by the total number of entries into the second stage. A non-limiting example can be found in table 140, based on the ratio (out of total) depicted in table 130: the ratio (out of total) calculated by struggle identification system 200 for the value iOS of the "type of OS installed on the device used to perform the session" characteristic is 0.05 (as shown in the first line of table 130 in FIG. 4). The value of the "Expected" column for the iOS entry in table 140 is thus calculated as: 0.05 times 1375, which is the total number of entries into the second stage, which equals 68. The struggle identification system 200 repeats the "Expected" column calculation for each of the values of the "type of OS installed on the device used to perform the session" characteristic, as shown in table 140.

For example, table 130 can be an analysis of the entries, during a given time period, into the registration stage (e.g. stage A 120-*a*, stage B 120-*b*, stage C 120-*c*, . . . , Stage N 120-*n*) of our flight ticket selling e-commerce application example above, and table 140 can be an analysis of entries into the flight choice stage, that is subsequent to the registration stage, during the same given time period.

It is to be noted that the customers entries into the second stage (e.g. stage A 120-*a*, stage B 120-*b*, stage C 120-*c*, . . . , Stage N 120-*n*) can be indicative of completion of the first stage by these customers.

Returning to FIG. 3, struggle identification system 200 can than identify one or more deviating values of the values, wherein a deviating value is a value of the values are associated with a first ratio between the first entries number and the second entries number of the deviating value that deviates from a second ratio of the first entries number and the second entries number for the values other than the deviating value, as determined by a statistical test (block 330). The deviating values are indicative of struggle of users of sessions characterized by the characteristic with die deviating values to complete the first stage (e.g. stage A 120-*a*, stage B 120-*b*, stage C 120-*c*, . . . , Stage N 120-*n*).

In some cases, a deviating value is identified when the deviation of the first ratio from the second ratio exceeds a threshold.

In some case, the statistical test is a chi-squared statistical test. The chi-squared statistical test is based on chi-square statistics that are defined with the following formula: "sum ((observed−expected)^2/expected)", meaning a summarize of the squared value of the observed entries count minus the "Expected" column entries values divided by the "Expected" column entries values. It is well known in the art that the above formula describes a chi-square distribution.

In order to use the chi-squared statistical test to analyze a first stage and a second stage, the struggle identification system 200 calculates for each of the possible values of a given characteristic of the sessions, the ratio (out of total) of the number of entries into the first stage, based on the count of the entries into the first stage, as depicted in table 130.

Struggle identification system 200 then calculates the "Expected" column values for each of the possible values of a given characteristic of the sessions based on the number of entries into the second stage and based on the ratio (out of total), as depicted in table 140.

Struggle identification system 200 then calculates the chi-square statistics based on the actual count of the number of entries into the second stage and the "Expected" column values. In our non-limiting example, in table 140, the chi-square statistics value is 18.

Struggle identification system 200 can work under the assumption that the observed number of entries into the second stage and the "Expected" values have a normal distribution and thus the square of their differences is distributed as a chi-square distribution Struggle identification system 200 now compares the chi-square statistics value with a critical value based on the chi-square distribution. Using statistical method that are known in the art, struggle identification system 200 calculates the critical value in our non-liming example, depicted in tables 130 and 140, to be 9.48772903678 with a P value of 0.00113047. The calculation of the critical value is based on the number of variables in the distribution minus one. In our non-limiting example, the number of possible values for the "type of OS installed on the device used to perform the session" characteristic is 6.6 minus 1, equals 5. In our non-limiting example, the struggle identification system 200 uses a 95% level of confidence to reach the above results.

As in our non-limiting example, the chi-square statistics value (18) is larger than the critical value (9), struggle identification system 200 identified that there is a deviation in the data distribution of the "type of OS installed on the device used to perform the session" characteristic. It is to be noted, that as in our non-limiting example, the P value is lower than a certain threshold, thus the test significance and the level of confidence in the results of struggle identification system 200 is high. In some cases, the certain threshold is 0.05.

Struggle identification system 200 then analyses which of the values of the characteristic have caused the deviation. This is achieved by struggle identification system 200 repeating the above described analysis for a number of times, while each time removing the entries for one of the values from tables 130 and 140. When the analysis stabilizes, meaning the calculated chi-square statistics value is less than the critical value, or the P value is higher than the certain threshold, the value removed is the deviating value.

Struggle identification system 200 can optionally provide the user with an alert indicating the deviating values (block 340). In some cases, the alert is provided utilizing the UI of struggle identification system 200. For example, by a pop-up screen that is displayed on the UI. The pop-up screen contains indications of the deviating values, for example, a given value of the type of OS that the statistical test found to be deviating from the normal distribution. The user can now optionally investigate why the given value has caused struggle to the customers of the first stage (e.g. stage A 120-*a*, stage B 120-*b*, stage C 120-*c*, . . . , Stage N 120-*n*) of funnel 110.

Struggle identification system 200 can optionally provide anomaly detection. When one or more deviating values are identified, the struggle identification system 200 detects an anomaly. The struggle identification system 200 can than analyze and alert the user of a source of the anomaly, being the deviating values. In some cases, the struggle identification system 200 is integrated with an external anomaly detection system, external to struggle identification system 200. In these cases, the information of the one or more deviating values is communicated from struggle identification system 200 to the anomaly detection system and a user of the anomaly detection system is alerted and can use the anomaly detection system to investigate the anomaly.

It is to be noted that, with reference to FIG. 3, some of the blocks can be integrated into a consolidated block or can be broken down to a few blocks and/or other blocks may be added. Furthermore, in some cases, the blocks can be performed in a different order than described herein. It is to be further noted that some of the blocks are optional (For example, block 340 can be optional). It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A struggle identification system, the system comprising processing circuitry configured to:
   obtain first information of first entries into a first stage and second information of second entries into a second stage, each entry of the first entries and each entry of the second entries is (a) performed during a respective session for performing an action, and (b) associated with a characteristic characterizing the respective session, wherein the characteristic is a discrete variable with a number of values;
   calculate, for each given value of the values, (a) a first entries number being the number of first entries associated with the characteristic having the given value into the first stage, and (b) a second entries number being the number of second entries associated with the characteristic having the given value into the second stage; and
   identify one or more deviating values of the values, wherein a deviating value is a value of the values associated with a first ratio between the first entries number and the second entries number of the deviating value that deviates from a second ratio of the first entries number and the second entries number for the values other than the deviating value, as determined by a statistical test, wherein the deviating values are indicative of struggle of users of sessions characterized by the characteristic with the deviating values to complete the first stage.

2. The struggle identification system of claim 1, wherein the first stage and the second stage are: (a) two subsequent stages of a sequence of stages, the second stage being subsequent to the first stage or (b) the same stage at different points in time or (c) two stages of a sequence of stages at different points in time.

3. The struggle identification system of claim 1, wherein the first stage and the second stage are identified based on input from a user of the system.

4. The struggle identification system of claim 1, wherein the processing circuitry is further configured to:
   provide a user of the system with an alert indicating the deviating values.

5. The struggle identification system of claim 1, wherein the deviating value is identified when the deviation of the first ratio from the second ratio exceeds a threshold.

6. The struggle identification system of claim 1, wherein the statistical test is a chi-squared statistical test.

7. The struggle identification system of claim 1, wherein the characteristic is one or more of the following: device type of a device used to perform the session, operating system of the device, resolution of a screen of the device or geolocation of the device during the session.

8. The struggle identification system of claim 1, wherein the session is a web session and each stage is a web page.

9. The struggle identification system of claim 1, wherein the session is an applicative session and each stage is a part of an application.

10. The struggle identification system of claim 9, wherein a device used to perform the session is a mobile device and each stage is a part of a mobile application.

11. A method comprising:
- obtaining, by a processing circuitry, first information of first entries into a first stage and second information of second entries into a second stage, each entry of the first entries and each entry of the second entries is (a) performed during a respective session for performing an action, and (b) associated with a characteristic characterizing the respective session, wherein the characteristic is a discrete variable with a number of values;
- calculating, by the processing circuitry, for each given value of the values, (a) a first entries number being the number of first entries associated with the characteristic having the given value into the first stage, and (b) a second entries number being the number of second entries associated with the characteristic having the given value into the second stage; and
- identifying, by the processing circuitry, one or more deviating values of the values, wherein a deviating value is a value of the values associated with a first ratio between the first entries number and the second entries number of the deviating value that deviates from a second ratio of the first entries number and the second entries number for the values other than the deviating value, as determined by a statistical test, wherein the deviating values are indicative of struggle of users of sessions characterized by the characteristic with the deviating values to complete the first stage.

12. The method of claim 11, wherein the first stage and the second stage are: (a) two subsequent stages of a sequence of stages, the second stage being subsequent to the first stage or (b) the same stage at different points in time or (c) two stages of a sequence of stages at different points in time.

13. The method of claim 11, wherein the first stage and the second stage are identified based on input from a user of the system.

14. The method of claim 11, wherein the deviating value is identified when the deviation of the first ratio from the second ratio exceeds a threshold.

15. The method of claim 11, wherein the statistical test is a chi-squared statistical test.

16. The method of claim 11, wherein the characteristic is one or more of the following: device type of a device used to perform the session, operating system of the device, resolution of a screen of the device or geolocation of the device during the session.

17. The method of claim 11, wherein the session is a web session and each stage is a web page.

18. The method of claim 11, wherein the session is an applicative session and each stage is a part of an application.

19. The method of claim 18, wherein a device used to perform the session is a mobile device and each stage is a part of a mobile application.

20. A non-transitory computer readable storage medium having computer readable program code embodied therewith, the computer readable program code, executable by at least one processor of a computer to perform a method comprising:
- obtaining, by a processing circuitry, first information of first entries into a first stage and second information of second entries into a second stage, each entry of the first entries and each entry of the second entries is (a) performed during a respective session for performing an action, and (b) associated with a characteristic characterizing the respective session, wherein the characteristic is a discrete variable with a number of values;
- calculating, by the processing circuitry, for each given value of the values, (a) a first entries number being the number of first entries associated with the characteristic having the given value into the first stage, and (b) a second entries number being the number of second entries associated with the characteristic having the given value into the second stage; and
- identifying, by the processing circuitry, one or more deviating values of the values, wherein a deviating value is a value of the values associated with a first ratio between the first entries number and the second entries number of the deviating value that deviates from a second ratio of the first entries number and the second entries number for the values other than the deviating value, as determined by a statistical test, wherein the deviating values are indicative of struggle of users of sessions characterized by the characteristic with the deviating values to complete the first stage.

\* \* \* \* \*